(12) United States Patent
Sexton et al.

(10) Patent No.: US 7,237,085 B2
(45) Date of Patent: Jun. 26, 2007

(54) ARCHITECTURE FOR A SCALABLE HEAP ANALYSIS TOOL

(75) Inventors: Harlan Sexton, Palo Alto, CA (US);
Robert Lee, Sunnyvale, CA (US);
Peter Benson, Boulder, UT (US)

(73) Assignee: Oracle International Corporation, Redwood Shores, CA (US)

( * ) Notice: Subject to any disclaimer, the term of this patent is extended or adjusted under 35 U.S.C. 154(b) by 327 days.

(21) Appl. No.: 10/857,554

(22) Filed: May 28, 2004

(65) Prior Publication Data

US 2005/0268053 A1    Dec. 1, 2005

(51) Int. Cl.
*G06F 12/00* (2006.01)

(52) U.S. Cl. ............... 711/221; 707/205; 707/206; 711/117; 711/202

(58) Field of Classification Search ............... None
See application file for complete search history.

(56) References Cited

U.S. PATENT DOCUMENTS

| | | | | |
|---|---|---|---|---|
| 5,051,893 A * | 9/1991 | Tenny et al. | ............... | 717/141 |
| 5,832,205 A * | 11/1998 | Kelly et al. | ............... | 714/53 |
| 5,958,061 A * | 9/1999 | Kelly et al. | ............... | 714/1 |
| 5,995,975 A * | 11/1999 | Malcolm | ............... | 707/103 R |
| 5,999,933 A * | 12/1999 | Mehta | ............... | 707/100 |
| 6,434,575 B1 * | 8/2002 | Berry et al. | ............... | 707/206 |
| 6,523,141 B1 * | 2/2003 | Cantrill | ............... | 714/48 |
| 6,564,223 B1 * | 5/2003 | Sexton et al. | ............... | 707/103 Y |
| 6,681,348 B1 * | 1/2004 | Vachon | ............... | 714/45 |
| 6,804,691 B2 * | 10/2004 | Coha et al. | ............... | 707/206 |
| 7,058,785 B1 * | 6/2006 | Ochotta | ............... | 711/202 |
| 2004/0181562 A1 * | 9/2004 | Findeisen | ............... | 707/206 |
| 2005/0055351 A1 * | 3/2005 | Barton et al. | ............... | 707/10 |
| 2005/0114844 A1 * | 5/2005 | Betancourt et al. | ............... | 717/128 |
| 2005/0120162 A1 * | 6/2005 | Sivaram | ............... | 711/101 |
| 2006/0155791 A1 * | 7/2006 | Tene et al. | ............... | 707/206 |

OTHER PUBLICATIONS

Foote, Bill, "HAT-The Java Heap Analysis Tool," java.net, retrieved from the internet at <https://hat.dev.java.net/doc/README.html>, retrieved on Nov. 7, 2005, 4 pages.
Livshits, Benjamin, "Finding Memory Leaks in Java with JDeveloper," Computer Science Department, Stanford University, retrieved from the internet at <http://suif.stanford.edu/~livshits/papers/pdf/mem.pdf>, 6 pages.

(Continued)

*Primary Examiner*—Reginald Bragdon
*Assistant Examiner*—Shawn Gu
(74) *Attorney, Agent, or Firm*—Hickman Palermo Truong & Becker LLP

(57) ABSTRACT

A method and software for analyzing a heap is described, in which a snapshot is made of a heap, which can be later analyzed by an analysis tool when a program that had run out of memory is no longer running. In one embodiment, an object allocated by the program is accessed and copied into a file, and an address of the object allocated by the process is recorded in association with an offset in the file of the copy of the object. The copy of the object copied into the file has preferably the same size as the object allocated by the process. A heap analysis tool may then be run on the objects copied into the file.

50 Claims, 4 Drawing Sheets

OTHER PUBLICATIONS

O'Hair, Kelly, "HPROF: A Heap/CPU Profiling Tool J2SE 5.0," Sun Developer Network, Nov. 18, 2004, retrieved from the internet at >http://java.sun.com/developer/technicalArticles/Programming/HPROF.html>, retrieved on Nov. 7, 2005, 7 pages.

Shirazi, Jack, "Tool Report: JProfiler," Java Performance Tuning, Jun. 2002, retrieved from the internet at <http://javaperformancetuning.com/tools/jprofiler/index.shtml>, retrieved on Nov. 7, 2005, 6 pages.

Livshits, Benjamin, "Finding Memory Leaks in Java with JDeveloper," Computer Science Department, Stanford University, retrieved from the internet at <http://suif.stanford.edu/~livshits/papers/pdf/mem.pdf>, 6 pages, 2005.

* cited by examiner

ARCHITECTURE FOR A SCALABLE HEAP ANALYSIS TOOL

FIELD OF THE INVENTION

The present invention relates to computer systems and more particularly to an architecture for a scalable heap analysis tool.

BACKGROUND OF THE INVENTION

During execution of a computer program, objects are allocated memory to store information. In many environments, memory management routines are provided to enable programmers to dynamically allocate and deallocate memory for objects during the execution of the program. The area of memory from which objects are dynamically allocated and reallocated is often referred to as a "heap." In some run-time environments, e.g. in a JAVA™ virtual machine, the memory management routines also provide for garbage collection, which automatically reclaims memory for objects that are no longer used, so that the reclaimed memory is available for subsequently allocating other objects.

Generally, a garbage collector determines whether an object is no longer used and can therefore recycle the object's memory when the object is no longer referenced within the program. However, some user programs in garbage-collected, run-time environments unintentionally keep references to objects that are no longer going to used in the program, thereby consuming large amounts of memory because keeping a reference to an object prevents the garbage collector from identifying the object as garbage and reclaiming that object's memory. If the program eventually requests to use more memory from the heap than what is available, the program runs out of memory, typically crashing or otherwise failing to perform its intended function.

Debugging the application programming errors that lead to running out of heap memory is a difficult process. Typically, such debugging involves analyzing which objects reference which other objects. Conventional techniques however, for analyzing the referencing relationships of user-created objects to determine why programs run out of memory are cumbersome and slow. One approach to analyzing these relationships is by running a tool in the virtual machine itself that would analyze the heap in the virtual machine and provide a digest of the memory allocation, e.g. how much memory is retained by which objects, but typically these tools also need heap memory to run, which is precisely the problem in low-memory situation.

Therefore, there is a need for method for analyzing a heap for memory errors, particularly in environments in which heap memory has been exhausted.

SUMMARY OF THE INVENTION

These and other needs are addressed by the present invention, which makes a snapshot of the heap, which can be later analyzed by an analysis tool when the program that had run out of memory is no longer running. In particular, the routine for dumping the snapshot of the heap can be crafted to operate in low-memory situations, by using a zero or a negligible amount of heap memory. Furthermore, in one embodiment, the heap can be dumped in a compact format to avoid placing large demands on the file system.

Accordingly, one aspect of the present invention relates to a method and software for recording the memory allocation for a collection of objects within a process for analysis, in which an object allocated by the process is accessed and copied into a file, and an address of the object allocated by the process is recorded in association with an offset in the file of the copy of the object. The copy of the object copied into the file preferably has the same size as the object allocated by the process.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for a heap analysis architecture are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Memory Model

One embodiment of the present invention is illustrated with respect to a memory model that is implemented for a multi-user run-time environment. Accordingly, a detailed description of the memory model for this working example is provided, but the present invention is not limited to this example nor to the use of this specific memory model but can be profitably used with other memory models.

Figure 1:
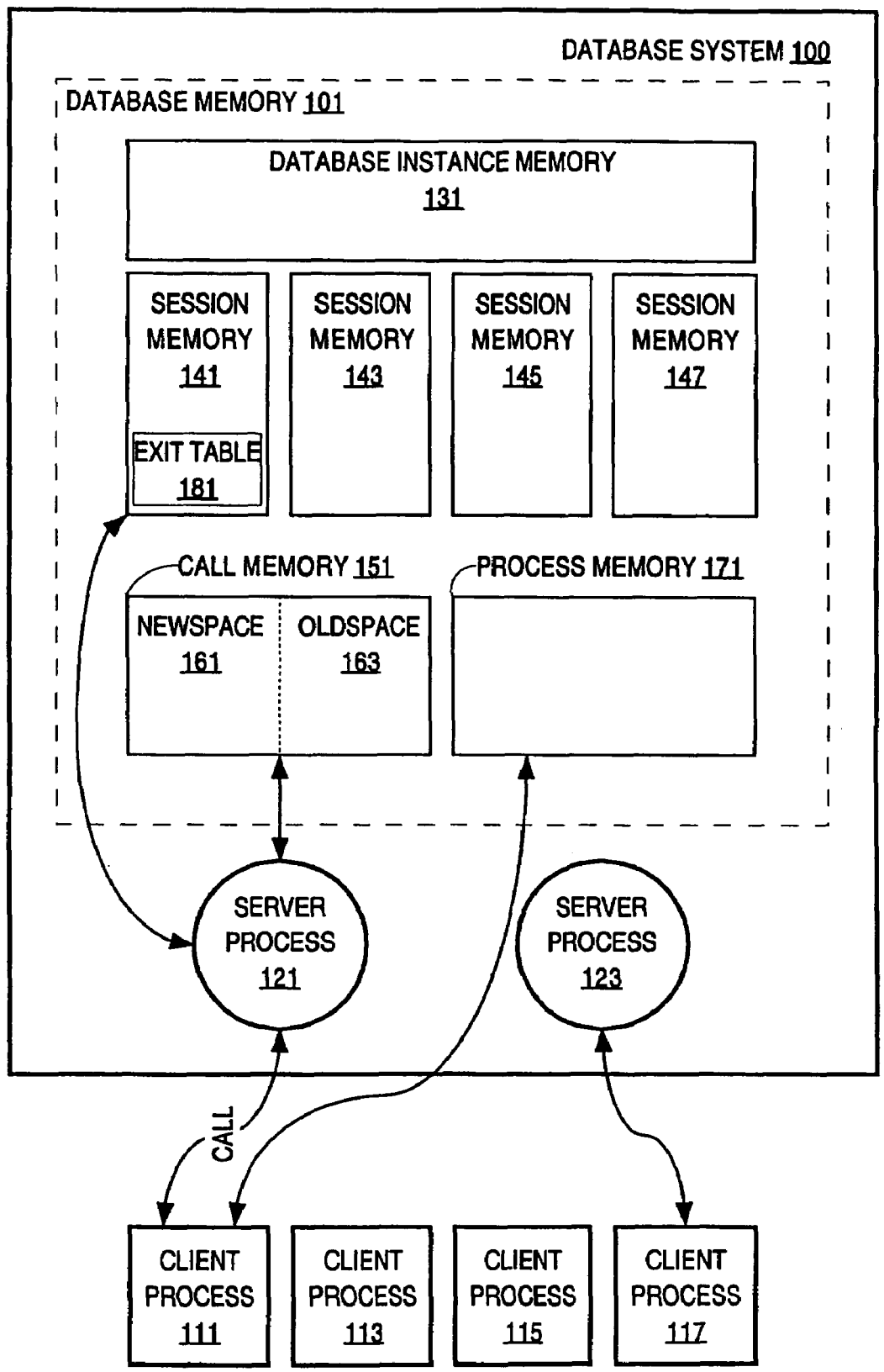
FIG. 1 schematically illustrates a memory model of a multi-user system with which a run-time environment may be used.

FIG. 1 schematically illustrates a multi-user database system 100 with which a run-time environment for a language such as the JAVA™ programming language may be used, although the present invention is not limited to multi-user database systems in particular and may be applied to other multi-user systems. In the illustrated configuration, client processes 111, 113, 115, and 117 establish database sessions with the database system 100. A database session refers to the establishment of a connection between a client and a database system through which a series a calls may be made. As long as the client remains connected in the database session, the client and the associated database session are referred to as being active. Active clients can submit calls to the database system 100 to request the database system 100 to perform tasks. One example of a call is a query in accordance with the Structured Query Language (SQL), and another example is a method invocation of a JAVA™ programming language object or class, defined for performing a database task for database system 100.

Database system 100 comprises, among other components, a database memory 101 for storing information useful for processing calls and a number of server processes 121 and 123 for handling individual calls. The database memory 101 includes various memory areas used to store data used by server processes 121 and 123. These memory areas include a database instance memory 131, session memories 141, 143, 145, and 147, call memory 151, and a process memory 171. It is to be understood that the number of the session memories, call memories, and process memories in FIG. 1 is merely illustrative and, in fact, the number of such memories will vary over time as various clients make various calls to the database system 100.

The database instance memory 131 is a shared memory area for storing data that is shared concurrently by more than one process. For example, shared memory area may be used store the read-only data and instructions (e.g., bytecodes of JAVA™ programming language classes) that are executed by the server processes 121 and 123. The database instance memory 131 is typically allocated and initialized at boot time of the database system 100, before clients connect to the database system 100.

When a database session is created, an area of the database memory 101 is allocated to store information for the database session. As illustrated in FIG. 1, session memories 141, 143, 145, and 147 have been allocated for clients 111, 113, 115, and 117, respectively, for each of which a separate database session has been created. Session memories 141, 143, 145, and 147 are a shared memory used to store static data, i.e., data associated with a user that is preserved for the duration of a series of calls, especially between calls issued by a client during a single database session. JAVA™ programming language static class variables are one example of such static data.

A call memory, such as call memory 151, is used to store data that is bounded by the lifetime of a call. A database call may include execution of a query or other kind of Structured Query Language (SQL) statements or a group of such statements within a database transaction. When client 111 submits a call to the database system 200, one of server processes 121 or 123 is assigned to process the call. For the duration of the call, the server process is allocated a call memory for storing data and other information for use in processing the call. For example, server process 121 uses call memory 151 and session memory 141 for processing a call submitted by client process 111.

An exit table 181 can be provided to keep track of those references within session memory 141 that refer to locations in call memory 151. The exit table 181 is updated when an assignment operation places a reference to a call memory object in a object living session memory. Maintenance of an exit table is described in greater detail in the co-pending, commonly assigned, U.S. patent application Ser. No. 10/339,707 entitled WRITE BARRIER HANDLING IN A MEMORY MANAGEMENT SYSTEM filed on Jan. 9, 2003 by Sexton et al., the contents of which are hereby incorporated by reference in their entirety herein.

At any given time, a server process (e.g., processes 121, 123) is assigned to process a call submitted by a single client (e.g., clients 111, 113, 115, 117). After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much fewer than the current number of active clients. Thus, database system 200 is typically configured to execute fewer server processes than the maximum number of active clients.

Process memory 171 is an area of memory that has the duration of a process and can be used to hold the virtual machine state of the process that is not user-specific. In one embodiment, use of the process memory 171 can be selectively available for specific processes. For example, process memory 171 may be available only for those processes that are started in a specific way, and sessions may be attached to such processes only they are intended to run the specific applications (e.g. an application server) that make use of the process memory 171 feature.

Since session memory is allocated for each active client session, user scalability is improved by reducing the memory requirements of session memory 141. The memory requirements for session memory 141 are reduced by keeping some long-living objects in call memory 151 and recreating the objects in call memory 151 before they are used in a subsequent call.

U.S. Pat. No. 6,564,223 entitled METHOD AND ARTICLE FOR MANAGING REFERENCES TO EXTERNAL OBJECTS IN A RUN-TIME ENVIRONMENT in re Sexton et al. describes a mechanism for keeping long-living objects in call memory 151 by deferring the allocation of objects in call memory 151 until those external objects are actually accessed. This and similar approaches employ lazy evaluation for resolving external objects, and by creating external numeric references to the external objects, such that when the external numeric reference is dereferenced.

In accordance with such an approach for the lazy evaluation of external references, a stub object for the external object is created in session memory 141. The stub object includes a "descriptor," which is a group of data that identifies the external object and is sufficient to create or recreate the external object. Typically, the descriptor is a string that names to the object or includes directions for loading and initializing the external object, for example, from an identified file in secondary storage. Furthermore, the stub object is associated with a "realize routine," which can be a static member function or a generic function for the stub object's class. The realize routine is responsible for creating or recreating the external object using the information encoded in the descriptor. The implementation of the realize routine and descriptor is dependent on the particular external object and is generally written specifically for that external object or for external objects belonging to a particular class.

When a pointer to the stub object is assigned to a slot in an object, for example during initialization of the object, a run-time external reference is generated based on the pointer to the stub object and stored in the slot instead of the pointer to the stub object. A run-time external numeric reference is a reference to an external object, such that dereferencing the run-time external numeric reference causes the external object to be loaded into virtual memory, if the external object is not currently loaded. In this embodiment, the run-time external reference is implemented as a tagged numeric reference, in which the tag bits indicate that the numeric reference is an external numeric reference and other the non-tag bits of the external reference indicates an index into a descriptor array and a value array. The value array stores pointers to objects in call memory 151 that have been activated; if the entry in the value array corresponding the index is null, then the corresponding descriptor, found by indexing the descriptor array, is used to activate the object in call memory 151 and the address of the activated object is cached in the value array. Accordingly, in this approach, long-living objects are recreated in call memory 151 as when the external numeric reference is dereferenced.

Dumping a Heap

Figure 2:
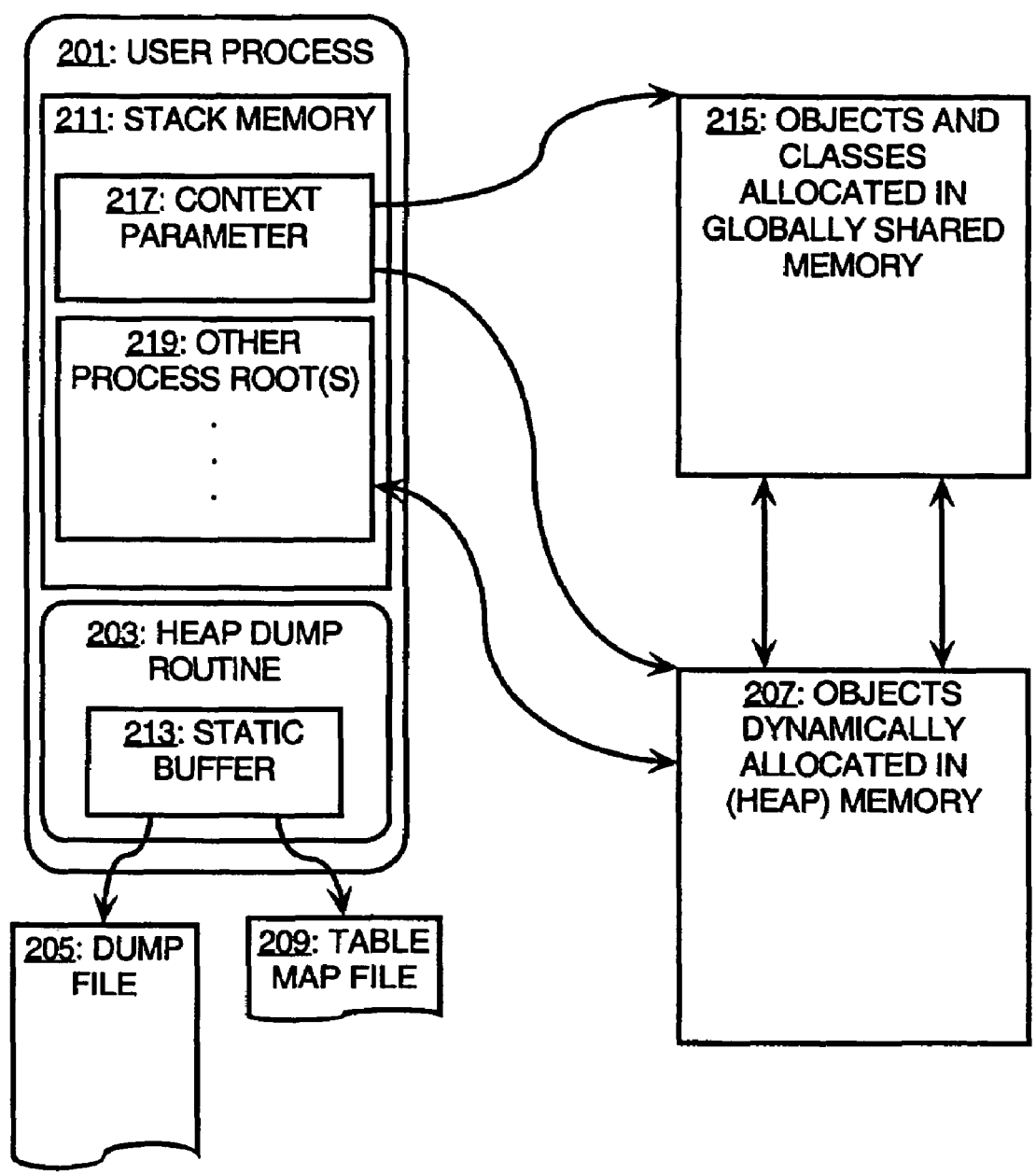
FIG. 2 is a high-level block diagram of a user process and objects allocated on a heap.

One aspect of the present invention is directed to a technique for dumping a heap that is useful even in low-memory situations. In accordance with one embodiment illustrated in FIG. 2, a user process 201 being debugged has been linked with a heap dumping routine 203, which is executed for writing out the objects and classes of the user process 201 into a dump file 205 stored in a persistent storage. The heap dumping routine 203 may be called directly in the execution of the user process 201 or initiated through a debugger in a debugging session.

To reduce memory demands in analyzing the heap of a program that ran low on memory, the heap dumping routine 203 preferably writes the image of those objects 207 dynamically allocated by the user process 201 into the dump file 205 without resorting to a verbose format. For example, the image written to the dump file 205 can be a bit-for-bit copy of the objects 209, or, in other embodiments, some canonicalized form of the object with the same size (e.g. converting the byte-order of the objects to a standard endianness). Use of an object representation that has the same size of the objects 207 does not place a multiplier effect on the memory requirements in the dump file 205, in contrast with verbose formats that include type information or other metadata to describe each of the dumped objects and their components.

In some cases, it is not necessary for the relative positions of objects 207 with regard to each other in raw memory be identical to the relative positions of the objects stored in the dump file 205. For example, some of the objects 207 may be garbage or the user process 201 may be executed in an environment in which the objects are not necessarily contiguous with each other or be allocated on pages that are not necessary contiguous. In such a situation, preserving the relative positions of the objects 207 in the dump file 205 would require reserving as padding over the garbage or between the non-contiguous portions. It may be therefore advantageous to save disk space by writing objects in the dump file 205 at different relative offsets. However, when objects are at different relative offsets, it is important to eventually update the pointers and other references to the objects to point to the new, relocated addresses of the objects.

Accordingly, the relocation information can be preserved in persistent storage so that the objects can be relocated at a later time. In one implementation, the heap dumping routine 203 also writes out a table map file 209 that associates the offsets of objects dumped in the dump file 205 with addresses of the objects 207 in raw memory. For example, an object allocated at virtual address 0x12345678 in raw memory may have been dumped into the dump file 205 at file offset 0x00100000. This information can be captured in the table map file 209 by storing the virtual address 0x12345678 and offset 0x00100000 in the dump file 205 in association with one another (e.g. by juxtaposition). Since the relocation information is preserved in the table map file 209, the heap dumping routine 203 need not consume additional memory for relocating the objects by itself, thereby enabling the heap dumping routine 203 to execute without needing to allocate memory dynamically, using only static memory such as a stack 211 and a static buffer 213 (which can even be allocated on the stack 211).

In addition to dumping the objects that have been dynamically allocated by the user program 201, it is useful to also dump the objects, classes, and static class variables 215 in a globally shared memory (such as database instance memory 131) because memory held by static class variables is a common source of out-of-memory problems. For example, an application developer may wonder why a particular class has 400 MB of allocated memory held by a static class variable of the class. On the other hand, some shared data, such as the byte codes for methods, is not interesting to the application developer in debugging memory consumption problems, because the memory consumed by such data is shared and/or fixed and is not responsible for why the user process 201 ran out of memory. This shared information need not be written out into the dump file 205. Thus, many pointers to such data, which are typically found in external references, can simply be zeroed, but those external references that go between the shared part 213 of the class back to the objects 207 in the session private part of the class are maintained because they do point to memory used by the user process 201 that contributes to running out of memory.

Generally, however, all live objects in the user space (e.g. objects that are private to the user process 201) are preferably dumped into the dump file 205. Objects in user space may include those objects in call memory 151, newspace 161, oldspace 163, and stack memory 211. In accordance with a multiple-virtual machine implementation such as that described in the commonly assigned and co-pending U.S. patent application Ser. No. 09/512,620, entitled USING A VIRTUAL MACHINE INSTANCE AS THE BASIC UNIT OF USER EXECUTION IN A SERVER ENVIRONMENT, filed on Feb. 25, 2000 by Harlan Sexton et al., the stack memory 211 may also contain a context parameter 217 that specifies the virtual machine instance employed by the user process 201, from which the roots of the garbage collector can be found. The roots of the garbage collector are those references whose logical closure includes all the entities considered live in the user process 201, such as objects and classes allocated in globally shared memory 215 and/or objects dynamically allocated in heap memory 207. In addition, the stack memory 211 may also include other process roots 219 that maintain references to objects, such as object on finalizer stacks. In one implementation, however, conservative roots (words having a bit pattern that looks like a valid reference) need not be followed since developers may find them more confusing than useful.

Figure 3:
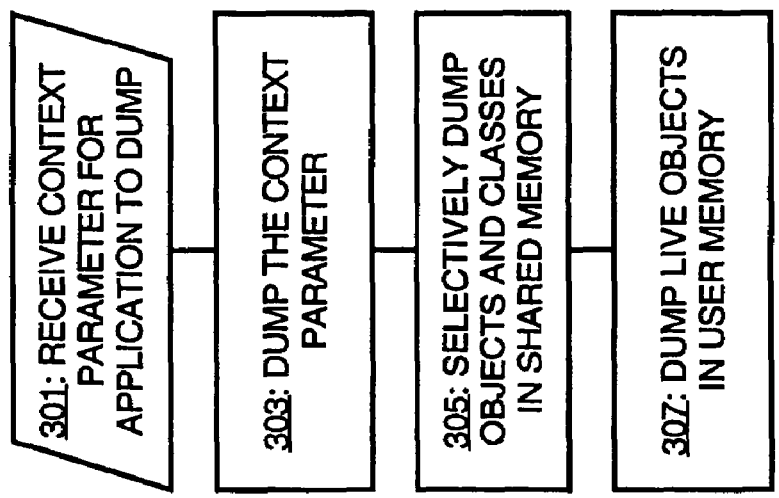
FIG. 3 is a flowchart illustrating a procedure for dumping heap objects in accordance with an embodiment of the present invention.

Referring to FIG. 3, a flowchart illustrates a procedure for dumping heap objects in accordance with an embodiment of the present invention. At step 301, the heap dumping routine 203 is called with the context parameter 217 that identifies the virtual machine instance whose memory allocation is being debugged. The context parameter 217 includes pointers and other references that eventually reach the roots of the garbage collector. At step 303, the context parameter 217 is dumped into the dump file 205. Because much the information in the context parameter 217 is meaningless to developers debugging user application, in one embodiment, a pseudo-object is constructed that holds the references to the relevant objects, including those that serve as roots for the garbage collector and a vector of objects on finalizer stacks, because if the user process 201 is hanging onto a lot of memory, then the memory hung onto should be reachable by the garbage collector from one or more of those objects.

At step 305, objects and classes in shared memory 215 are selectively dumped into the dump file 205. In one embodiment, references to the shared memory are followed in a recursive, depth-first manner to avoid dumping everything the shared space. In particular, byte-codes and methods are not copied into the dump file 205. One advantage for dumping the shared objects and classes early in the dump file 205 is that it makes the processing of the dump file easier. For example, it is easier to have all the class information, which includes all the necessary format information, to appear in dump file 205 before the instances of the class.

At step 307, the live objects in the user space 207, 211 are dumped, including those allocated on the heap 207 and those on the stack 211. In one implementation, this can be accomplished by calling routines in the garbage collector for visiting, scanning, and dumping live objects into the dump file 205. Dead objects or garbage, on the other hand, are not visited and not dumped.

Figure 4:
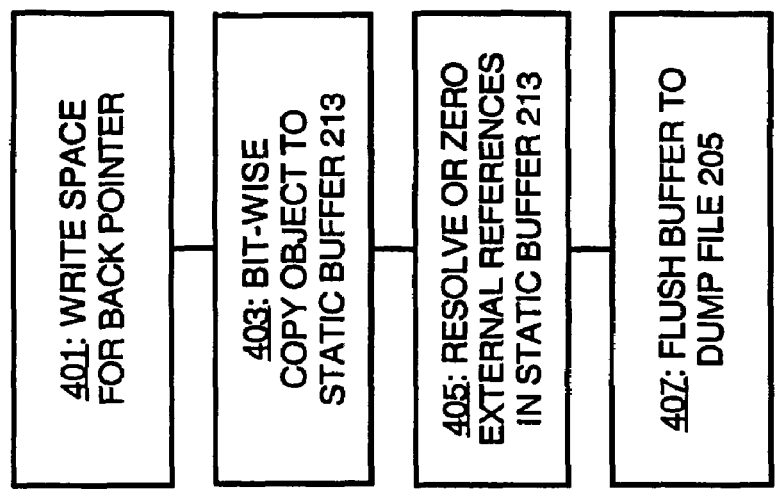
FIG. 4 is a flowchart illustrating a procedure for dumping and modifying an object in accordance with an embodiment of the present invention.

Referring now to FIG. 4, the operation in accordance with one embodiment of the present invention for dumping an object is illustrated. At step 401, each object is preceded by an 8-byte word to facilitate the operation of the heap analysis tool, as explained herein below. The 8-byte word can be of any size sufficient to store a back pointer used by the heap analysis tool, but the heap dumping routine 203 need only reserve space for that back pointer by writing zero bytes for the length of the back pointer into the dump file 205.

At step 403, the object itself is dumped, starting by copying the object bit-by-bit into the static buffer 213. In most cases, the object is ready to be written to the dump file 205, but in a preferred embodiment, external references are first resolved or removed before being written to the dump file 205. For example, external references to entities that need not be dumped such as bytecodes can be zeroed out without loss of functionality in debugging the developer's errors in using memory. Also, since application developers are not familiar with how external references are resolved, especially for those external references from a shared class variable to private data, external references are replaced by the pointer to the private data. In this embodiment, therefore, external references are modified in the static buffer 213 (step 405) before the static buffer 213 is flushed to disk (step 407) to be part of the dump file 205. Another modification is to remove from references embedded pointer tags and other run-time information not relevant to developers. Modifying the object in this manner in the static buffer 213 advantageously allows for the object to be processed for use by a heap analysis tool, without requiring additional memory and without modifying the live object on the heap so that execution of the user process 201 can be continued, perhaps even to a point at which another snapshot of the heap can be dumped.

Heap Analysis

Figure 5:
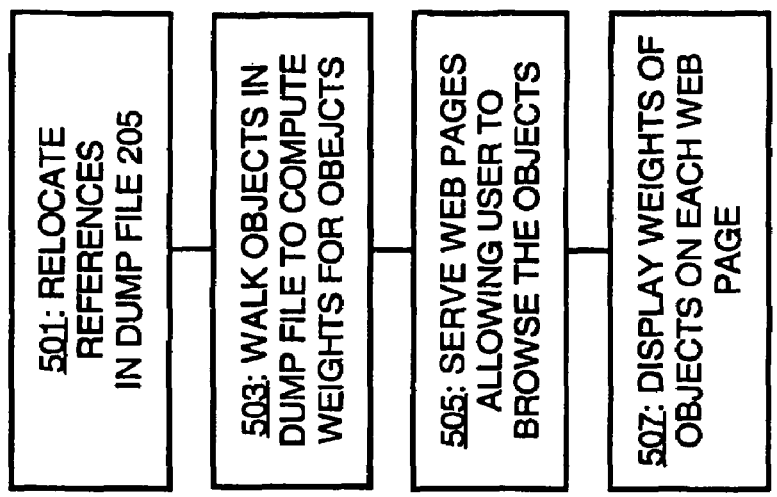
FIG. 5 is a flowchart illustrating a procedure for analyzing a dumped heap in accordance with an embodiment of the present invention.

Referring now to FIG. 5, the operation of a heap analysis tool in accordance with one embodiment of the present invention is illustrated. At step 501, on the first time the heap analysis tool is invoked on a dump file, the references in the dumped heap are relocated. In one implementation, the dump file 205 and table map file 209 are memory-mapped in memory and hash tables are built from the information in the table map file 209 to access quickly the associations between the addresses in the virtual machine and the offsets of objects in the memory-mapped dump file 205 that were recording the table map file 209. Then the dump file 205 is scanned (for example, by using the scanning code of the garbage collector), relocating the references that are found in the objects via the constructed hash tables, as by replacing the virtual machine address that were originally recorded in the dump file 205 with the offset of the referenced object in the memory-mapped dump file 205. If an object contains a reference to an object that is not dumped in the dump file 205 or an unprocessed external reference, that reference is zeroed. The changes to the dump file 205 during for relocation can be saved so that an subsequent invocation of the heap analysis tool on the dump file 205 file need not perform this relocation again.

In step 503, a depth-first graph walk of the object state in the dump file 205, starting from the root object, which include the Java stack, Java class static variables, objects awaiting finalization, and Java Native Interface (JNI) references. The depth-first walk allows strong references, which are visible to and maintained by the garbage collector, to a given object be found, and to compute a quantity which we refer to as the object's weight. The weight of an object acts as a estimate of size in bytes of the memory that would be garbage collected if we removed all references to that object. The weight of an object can be defined, in one implementation, to be the sum of size in bytes of the object plus the size of all of the objects below that object in the depth-first walk. If the graph of objects in the snapshot is a tree, in which each object has exactly one referencing object, then the weight is an accurate estimate. However, an object is subtended by an object that has additional links, then the weight may be larger, and perhaps much larger, than the estimated value. Accordingly, the weight informs the developer that a particular object is a good candidate for the cause of holding on to so much memory.

To assist in calculating the weight of objects, an auxiliary node is constructed for each object, and a pointer back to this node is recorded so that an estimate of the size of the state that is implicated by each object can be computed. In one implementation, space for the back pointers has already been reserved in the dump file with the 8-byte prefix, but in other implementations ancillary data structures such as another hash table can be used to store this information.

After this processing is complete, the heap analysis tool becomes a simple web server in step 505, allowing users to browse the dumped state. Specifically, both the context parameter 217 and root objects 219 are initially display on a browser operated by a user. When the user clicks on an object, the heap analysis tool displays at least some of that object (e.g. if the object is very large, only about the first 500 slots need be displayed) in a newly generated web page viewable in the user's browser. If a slot contains reference to another object, that slot is displayed as a clickable link, which will bring up another web page when activated.

In one embodiment, in step 507, when the links from an object are displayed, the value of the weight of a link divided by the weight of the object is displayed as a percentage, particularly if the percentage exceeds a predetermined threshold such as is 10% or more. This display helps developers to find the weightiest objects.

Accordingly, the developer is empowered to browse the application program's heap, which can be invaluable in understanding why the heap grows. Generating web pages upon request advantageously allows for very large heaps to be displayed while still allowing the developer to see all of the relevant information.

Hardware Overview

Figure 6:
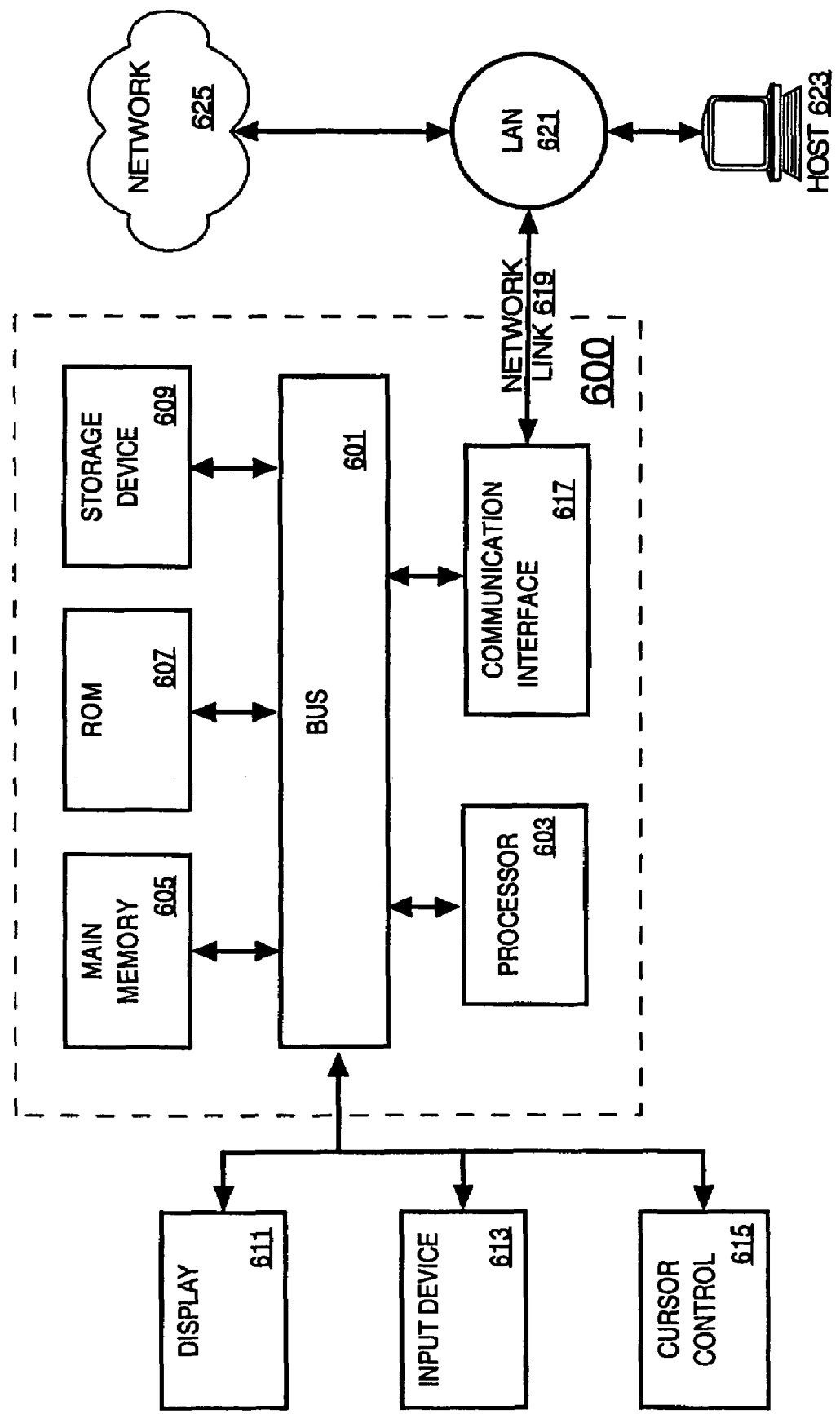
FIG. 6 depicts a computer system that can be used to implement an embodiment of the present invention.

FIG. 6 illustrates a computer system 600 upon which an embodiment according to the present invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, heap analysis is provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the present invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 605 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for analyzing memory allocation of objects by a process, comprising:
    copying an object, residing in memory, into a file, wherein the copy of the object residing in the file has a same size as the object residing in memory;
    storing, in a map file, (a) an address of the object residing in memory, (b) an offset of the location of the copy of the object residing in the file, and (c) a mapping between the address and the offset;
    wherein the map file is either the file or is separate from the file;
    scanning the file;
    determining that a copy of a second object contains a reference to the object;
    based on the reference, locating the mapping in the map file or locating the mapping in memory if the mapping has been stored in memory;
    based on the mapping, using the offset to locate the copy of the object residing in the file.

2. A computer-readable storage medium bearing instructions for analyzing memory allocation of objects by a process, said instructions being arranged, when executed by one or more processors, to perform the method according to claim 1.

3. A method according to claim 1, further comprising:
    allocating a static memory buffer; and
    buffering the copying using the static memory buffer.

4. A computer-readable storage medium bearing instructions for analyzing memory allocation of objects by a process, said instructions being arranged, when executed by one or more processors, to perform the method according to claim 3.

5. A method according to claim 3, further comprising:
    determining whether the object includes an external reference; and
    upon determining that the object includes an external reference, modifying the external reference in the copy of the object buffered in the static memory buffer before flushing the buffered object to a secondary storage.

6. A computer-readable storage medium bearing instructions for analyzing memory allocation of objects by a process, said instructions being arranged, when executed by one or more processors, to perform the method according to claim 5.

7. A method according to claim 1, further comprising:
    selecting a strict subset of all objects residing in the memory which are to be copied into the file, wherein the strict subset includes the object.

8. A computer-readable storage medium bearing instructions for analyzing memory allocation of objects by a process, said instructions being arranged, when executed by one or more processors, to perform the method according to claim 7.

9. A method according to claim 7, wherein the selecting the strict subset includes:
    determining whether the object is referenced by a pointer in a shared memory available to another process concurrently executing with the process;
    selecting another process concurrently executing with the process; and
    selecting the object based on said determining whether the object is referenced by the pointer.

10. A computer-readable storage medium bearing instructions for analyzing memory allocation of objects by a process, said instructions being arranged, when executed by one or more processors, to perform the method according to claim 9.

11. A method according to claim 9, wherein the selecting the strict subset of the objects is based on a location from where the objects were referenced.

12. A computer-readable storage medium bearing instructions for analyzing memory allocation of objects by a process, said instructions being arranged, when executed by one or more processors, to perform the method according to claim 11.

13. A method according to claim 1, wherein the file is recorded in a persistent storage.

14. A computer-readable storage medium bearing instructions for analyzing memory allocation of objects by a process, said instructions being arranged, when executed by one or more processors, to perform the method according to claim 13.

15. A method according to claim 1, further comprising copying a root object into the file.

16. A computer-readable storage medium bearing instructions for analyzing memory allocation of objects by a process, said instructions being arranged, when executed by one or more processors, to perform the method according to claim 15.

17. A method according to claim 1, further comprising:
writing a dummy value in the file having a size capable of storing a back-pointer to another object that references the object.

18. A computer-readable storage medium bearing instructions for analyzing memory allocation of objects by a process, said instructions being arranged, when executed by one or more processors, to perform the method according to claim 17.

19. A method according to claim 17, wherein said writing includes writing the dummy value in the file before copying the object into the file.

20. A computer-readable storage medium bearing instructions for analyzing memory allocation of objects by a process, said instructions being arranged, when executed by one or more processors, to perform the method according to claim 19.

21. A method according to claim 1, wherein storing the address includes writing the address of the object into another file.

22. A computer-readable storage medium bearing instructions for analyzing memory allocation of objects by a process, said instructions being arranged, when executed by one or more processors, to perform the method according to claim 21.

23. The method of claim 1, wherein determining how much space would be reclaimed is performed using a depth-first graph walk, of an object state, for the object.

24. A computer-readable storage medium bearing instructions for analyzing memory allocation of objects by a process, said instructions being arranged, when executed by one or more processors, to perform the method according to claim 23.

25. A method according to claim 1, further comprising:
determining, without garbage collecting the object, how much space would be reclaimed in memory if the object were to be garbage collected; and
providing, to a user, information about how much space would be reclaimed in memory if the object were to be garbage collected.

26. A computer-readable storage medium bearing instructions for analyzing memory allocation of objects by a process, said instructions being arranged, when executed by one or more processors, to perform the method according to claim 25.

27. A method for analyzing memory allocation of objects by a process, comprising:
copying an object, residing in memory, into a file that is persistently stored, wherein the copy of the object in the file has a same size as the object residing in memory;
storing, in a map file, (a) an address of the object residing in memory, (b) an offset of the location of the copy of the object in the file, and (c) a mapping between the address and the offset;
wherein the map file is either the file or is separate from the file;
scanning the file;
determining that a copy of a second object contains a reference to the object;
based on the reference, locating the mapping in the map file or locating the mapping in memory if the mapping has been stored in memory;
based on the mapping, using the offset to locate the copy of the object residing in the file;
generating a display that displays a link, wherein selecting said link causes information about how much space would be reclaimed in memory if the object were to be garbage collected; and
sending said display to a user for presentation to said user.

28. A computer-readable storage medium bearing instructions for analyzing memory allocation of objects by a process, said instructions being arranged, when executed by one or more processors, to perform the method according to claim 27.

29. The method of claim 27, wherein said display is a web page.

30. A computer-readable storage medium bearing instructions for analyzing memory allocation of objects by a process, said instructions being arranged, when executed by one or more processors, to perform the method according to claim 29.

31. A method according to claim 27, further comprising:
allocating a static memory buffer; and
buffering the copying of the object into the file using the static memory buffer.

32. A computer-readable storage medium bearing instructions for analyzing memory allocation of objects by a process, said instructions being arranged, when executed by one or more processors, to perform the method according to claim 31.

33. A method according to claim 31, further comprising:
determining whether the object includes an external reference; and
upon determining that the object includes an external reference, modifying the external reference in the copy of the object buffered in the static memory buffer before flushing the buffered object to a secondary storage.

34. A computer-readable storage medium bearing instructions for analyzing memory allocation of objects by a process, said instructions being arranged, when executed by one or more processors, to perform the method according to claim 33.

35. A method according to claim 27, further comprising:
selecting a strict subset of all objects residing in the memory which are to be copied into the file, wherein the strict subset includes the object.

36. A computer-readable storage medium bearing instructions for analyzing memory allocation of objects by a process, said instructions being arranged, when executed by one or more processors, to perform the method according to claim 35.

37. A method according to claim 35, wherein the selecting the strict subset includes:
determining whether the object is referenced by a pointer in a shared memory available to another process concurrently executing with the process; selecting another process conculTently executing with the process; and
selecting the object based on said determining whether the object is referenced by the pointer.

38. A computer-readable storage medium bearing instructions for analyzing memory allocation of objects by a process, said instructions being arranged, when executed by one or more processors, to perform the method according to claim 37.

39. A method according to claim 37, wherein the selecting the strict subset of the objects is based on a location from where the objects were referenced.

40. A computer-readable storage medium bearing instructions for analyzing memory allocation of objects by a process, said instructions being arranged, when executed by one or more processors, to perform the method according to claim 39.

41. A method according to claim 27, wherein the file is recorded in a persistent storage.

42. A computer-readable storage medium bearing instructions for analyzing memory allocation of objects by a process, said instructions being arranged, when executed by one or more processors, to perform the method according to claim 41.

43. A method according to claim 27, further comprising copying a root object into the file.

44. A computer-readable storage medium bearing instructions for analyzing memory allocation of objects by a process, said instructions being arranged, when executed by one or more processors, to perform the method according to claim 43.

45. A method according to claim 27, further comprising:
 writing a dummy value in the file having a size capable of storing a back-pointer to another object that references the object.

46. A computer-readable storage medium bearing instructions for analyzing memory allocation of objects by a process, said instructions being arranged, when executed by one or more processors, to perform the method according to claim 45.

47. A method according to claim 45, wherein said writing includes writing the dummy value in the file before copying the object into the file.

48. A computer-readable storage medium bearing instructions for analyzing memory allocation of objects by a process, said instructions being arranged, when executed by one or more processors, to perform the method according to claim 47.

49. A method according to claim 27, wherein storing the address includes writing the address of the object into another file.

50. A computer-readable storage medium bearing instructions for analyzing memory allocation of objects by a process, said instructions being arranged, when executed by one or more processors, to perform the method according to claim 49.

* * * * *

UNITED STATES PATENT AND TRADEMARK OFFICE
CERTIFICATE OF CORRECTION

PATENT NO. : 7,237,085 B2  Page 1 of 1
APPLICATION NO. : 10/857554
DATED : June 26, 2007
INVENTOR(S) : Harlan Sexton et al.

It is certified that error appears in the above-identified patent and that said Letters Patent is hereby corrected as shown below:

COLUMN 12
Claim 3: Line 6, delete "copying using" and insert --copying of the object into the file using--.

COLUMN 14
Claim 37: Line 55, delete "conculTently" and insert --concurrently--.

Signed and Sealed this

Fifteenth Day of April, 2008

JON W. DUDAS
*Director of the United States Patent and Trademark Office*